J. P. O'NEIL.
Target-Sheet.
No. 197,397. Patented Nov. 20, 1877.
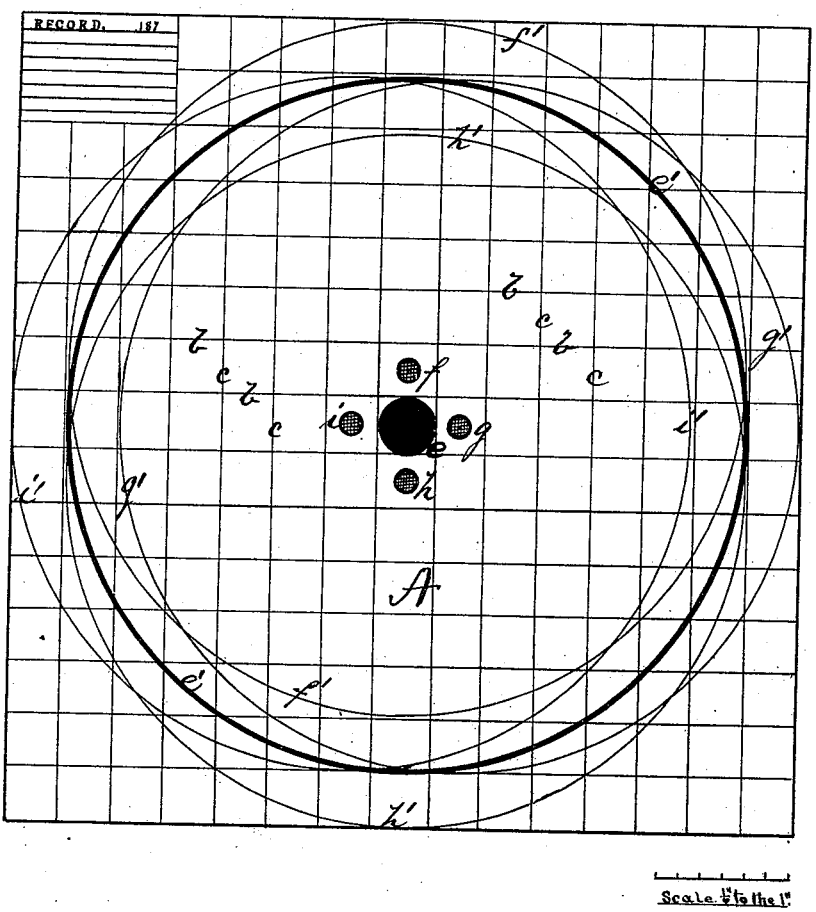

UNITED STATES PATENT OFFICE.

J. PALMER O'NEIL, OF PITTSBURG, PENNSYLVANIA.

IMPROVEMENT IN TARGET-SHEETS.

Specification forming part of Letters Patent No. 197,397, dated November 20, 1877; application filed October 9, 1877.

*To all whom it may concern:*

Be it known that I, J. PALMER O'NEIL, of Pittsburg, in the county of Allegheny and State of Pennsylvania, have invented a new and useful Improvement in Target-Sheets; and I do hereby declare the following to be a full, clear, and exact description thereof, reference being had to the accompanying diagram, illustrating my invention.

In testing the quality of shot, the distribution of shot by any given gun, or a brand of powder, several points have to be determined before positive judgment can be formed as to the value of either.

It frequently happens that, owing to the lack of uniformity in size, shape, or formation of certain makes of shot, they will not distribute equally and uniformly, but will spread widely at some places, and bunch or cluster at others; and, again, the same result may occur from the construction of the gun. It may throw the shot in a bunch or cluster, or may bunch portions of the charge, scattering the rest widely, so that though the selected circle may give good results as to number of pellets, yet the general distribution may be far from satisfactory.

The present method of determining the distribution of guns, or brands of shot or powder, is by means of a circle of any desired size, say thirty inches diameter, drawn on a target of, perhaps, thirty-four or thirty-five inches square, after the gun has been fired at the blank sheet.

Owing to peculiarities of the gun or marksman, the aim is frequently off the center of the target, for which reason a circle selected after the firing has to be struck to obtain equitable results on which to base a judgment.

The object of my invention is the production of a target-sheet or diagram which will exhibit plainly and readily, without calculation or subsequent manipulation, first, the distribution of the shot, and, secondly, the character of the distribution due to either gun, powder, or shot, as the case may be.

To this end the invention consists, first, in a target-sheet having a series of circles whose centers are arranged around and off of the center of the main circle, so as to compensate for any error of aim or fault of the gun, whereby the subsequent selection of a circle for test purposes is avoided; and, secondly, in a target-sheet having a series of circles with centers off the center of the main circle, and divided into a series of spaces by crossing lines, whereby the relative number and relative position of spaces hit can be readily ascertained, and the character of the distribution also determined.

I will now proceed to describe my invention with reference to the diagram, so that others skilled in the art to which it appertains may apply the same.

A indicates a sheet of paper of suitable proportions for a target-sheet, which I divide into a series of spaces by any number of lines, $b\ c$, crossing each other, preferably at right angles, so as to inclose squares. The center $e$ of the target-sheet is then taken as the center of the main or target circle, whose periphery is lettered $e'$, and the spaces immediately above, below, and on the sides of the target-center $e$ (marked $f, g, h$, and $i$,) are taken as centers off of the main center $e$ for select circles $f', g', h'$, and $i'$, as being the directions in which variation of aim will most frequently occur.

If desired, other circles may be drawn whose centers will occupy the intervals between the centers $f, g, h$, and $i$; but such an elaboration will seldom, if ever, be necessary.

Each center and its circle should have a distinctive color—as, for instance, red, blue, black, &c.

The left-hand upper corner of the target-sheet is preferably selected as the place for recording the test—*i. e.*, number and caliber of gun, charge, and brand of powder and shot, &c., points well known to the sportsman—and for that purpose is left blank, as shown in the diagram, though, if preferred, either of the other corners may be used for the purpose.

I do not purpose to limit myself to exact proportions and spacings, but will mention herein certain proportions which I have found to answer the purpose, and give a well-proportioned target-sheet: target-sheet, thirty-five by thirty-five inches; center square, two and a half by two and a half inches; other squares, two and five-sixteenths by two and five-sixteenths inches; diameters of main or target and selected circles, each thirty inches;

small black spot in the center of target-sheet, two and a half inches diameter.

The advantages of my target-sheet are, the readiness and facility with which the distribution, as well as the general and special character thereof, can be determined, and the avoidance of all calculations or adjustments of selected circles after firing.

Having thus described my invention, what I claim, and desire to secure by Letters Patent, is—

1. A target-sheet having a series of circles marked thereon whose centers are off of the center of the main or target circle, substantially as and for the purpose specified.

2. A target-sheet spaced off by intersecting lines, and having a series of circles marked thereon whose centers are off the center of the main or target circle, substantially as and for the purpose specified.

In testimony whereof I, the said J. PALMER O'NEIL, have hereunto set my hand.

J. PALMER O'NEIL.

Witnesses:
 A. C. JOHNSTON,
 JOHN R. SMITH.